United States Patent
Inoue et al.

(10) Patent No.: US 6,341,000 B1
(45) Date of Patent: *Jan. 22, 2002

(54) LIQUID-CRYSTAL PANEL OF POLYMER DISPERSED TYPE AND METHOD OF MANUFACTURING THE SAME

(75) Inventors: Kazuo Inoue; Tsuyoshi Uemura, both of Osaka (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,144

(22) Filed: Jun. 29, 1998

Related U.S. Application Data (62) Division of application No. 08/834,882, filed on Apr. 7, 1997, now abandoned, which is a continuation of application No. 08/361,550, filed on Dec. 22, 1994.

(30) Foreign Application Priority Data

Dec. 27, 1993 (JP) .............................................. 5-330896
Apr. 26, 1994 (JP) ............................................. 6-088191

(51) Int. Cl.$^7$ ............................................ G02F 1/1333
(52) U.S. Cl. .............................. 349/93; 349/92; 349/86
(58) Field of Search ............................ 349/92, 93, 89, 349/86, 90, 155, 182, 183

(56) References Cited

U.S. PATENT DOCUMENTS

| | | | |
|---|---|---|---|
| 4,113,595 A | * | 9/1978 | Hagiwana et al. ..... 204/159.17 |
| 4,685,771 A | * | 8/1987 | West et al. .................... 349/86 |
| 4,834,509 A | | 5/1989 | Gunjima et al. .............. 349/58 |

(List continued on next page.)

FOREIGN PATENT DOCUMENTS

| | | |
|---|---|---|
| EP | 0 409 442 | 1/1991 |
| EP | 0 529 672 | 3/1993 |
| EP | 0 540 806 | 5/1993 |
| EP | 0 590 984 | 4/1994 |
| JP | 58-72925 | 5/1983 |
| JP | 1-144021 | 6/1989 |
| JP | 4-288525 | 10/1992 |

OTHER PUBLICATIONS

N.A. Vas et al., "A Light Control Film Composed of Liquid Crystal Droplets Dispersed in a UV–Curable Polymer", Liquid Crystals, 1987, vol. 146, pp. 1–15.

A.M. Lackner et al., "Methods to Obtain Lower–Voltage–Activated Polymer–Dispersed LCDs", Proceedings of the SID, 32 (1991) No. 3.

*Primary Examiner*—William L. Sikes
*Assistant Examiner*—Dung Nguyen
(74) *Attorney, Agent, or Firm*—McDermott, Will & Emery (57) ABSTRACT

A liquid-crystal panel comprises a pair of transparent glass substrates each being provided with an electrode. Between the glass substrates are disposed spacers for defining a space and a mixture of droplets of a liquid crystal having a mean diameter of 3.0 μm or less and of a photo-curing polymer. The edge portions of the glass substrates are sealed with a seal polymer. In curing the photo-curing polymer during the process of manufacturing the liquid-crystal panel, the dose of an ultraviolet ray is set to 500 mJ/cm$^2$ or more so as to reduce the diameters of the droplets of the liquid crystal, thereby preventing light leakage in the state without a voltage applied and improving the contrast. If the spacers are colored, the effect of preventing light leakage is increased. If the spacers are subjected to a surface treatment for rejecting the liquid crystal or composed of a polymer material of the same type as that of the photo-curing polymer, variations in diameter of the droplets of the liquid crystal can be prevented. With the structure, it becomes possible to provide a liquid-crystal panel in which light leakage in the black mode is reduced and which presents uniform and high-contrast display of images.

4 Claims, 5 Drawing Sheets

U.S. PATENT DOCUMENTS

| | | | |
|---|---|---|---|
| 4,869,847 A | * 9/1989 | Leslie et al. | 252/299.01 |
| 4,890,902 A | * 1/1990 | Doane et al. | 349/89 |
| 4,989,955 A | 2/1991 | Ito et al. | 349/157 |
| 4,992,201 A | * 2/1991 | Pearlman | 349/89 |
| 5,130,831 A | 7/1992 | Kohara et al. | 355/324 |
| 5,223,964 A | 6/1993 | Nagano et al. | 349/155 |
| 5,270,843 A | * 12/1993 | Wang | 349/90 |
| 5,323,251 A | * 6/1994 | Coates et al. | 349/89 |
| 5,389,288 A | * 2/1995 | Rindo et al. | 349/155 |
| 5,410,424 A | * 4/1995 | Konuma et al. | 349/86 |
| 5,486,941 A | * 1/1996 | Saiuchi et al. | 349/155 |
| 5,494,604 A | * 2/1996 | Chung | 252/299.01 |
| 5,496,497 A | * 3/1996 | Takiguchi et al. | 349/182 |
| 5,604,612 A | * 2/1997 | Coates et al. | 349/86 |
| 5,867,238 A | * 2/1999 | Miller et al. | 349/86 |
| 5,875,008 A | * 2/1999 | Takahara et al. | 349/95 |

* cited by examiner

LIQUID-CRYSTAL PANEL OF POLYMER DISPERSED TYPE AND METHOD OF MANUFACTURING THE SAME

This is a divisional abandoned application of Ser. No. 08/834,882, filed Apr. 7, 1997, now abandoned which is a file wrapper continuation of Ser. No. 08/361,550, filed Dec. 22, 1994.

BACKGROUND OF THE INVENTION

The present invention relates to a liquid-crystal panel for use in a liquid-crystal display apparatus, an optical shutter, or the like, to a method of manufacturing the same, and to a liquid-crystal display apparatus using the liquid-crystal panel.

Liquid-crystal panels, which are small in size, light in weight, and operable with low power voltage, have a wide range of applications as means for displaying a variety of visually recognizable patterns. For example, such appliances as wrist watches, electronic tabletop calculators, personal computers, and personal word processors often use liquid-crystal panels therein for their further miniaturization and weight reduction. However, since a liquid-crystal panel of TN (twisted nematic) type or STN (supertwisted nematic) type currently used requires a polarizing plate, its light transmittance and long-term light resistance are unsatisfactory. By contrast, since a panel containing a polymer dispersed liquid crystal (PDLC) does not require a polarizing plate, it is free from the above-mentioned drawbacks.

Figure 5A:
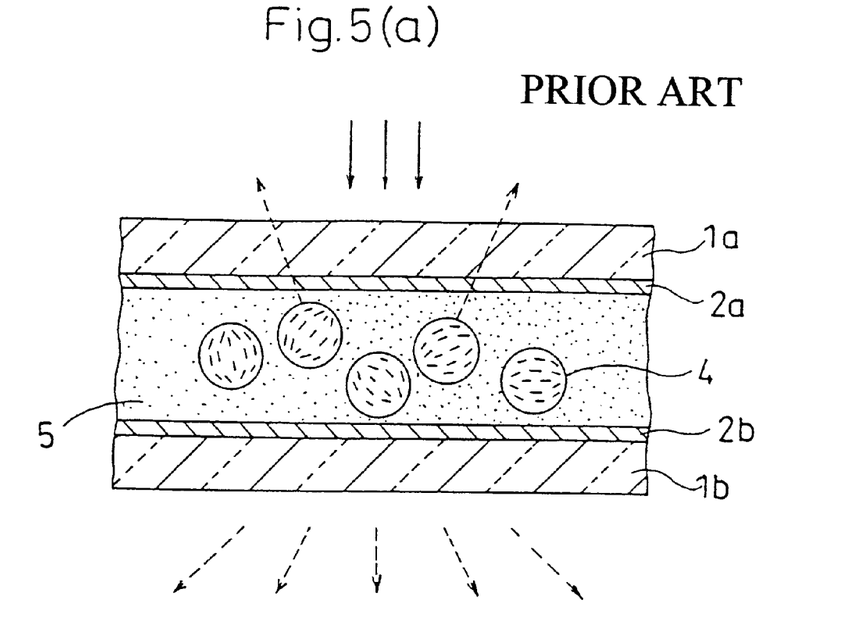
FIG. 5(a) is a cross-sectional view diagrammatically showing the phenomenon of light scattering caused by a polymer dispersed liquid-crystal when a voltage is applied thereto.
Figure 5B:
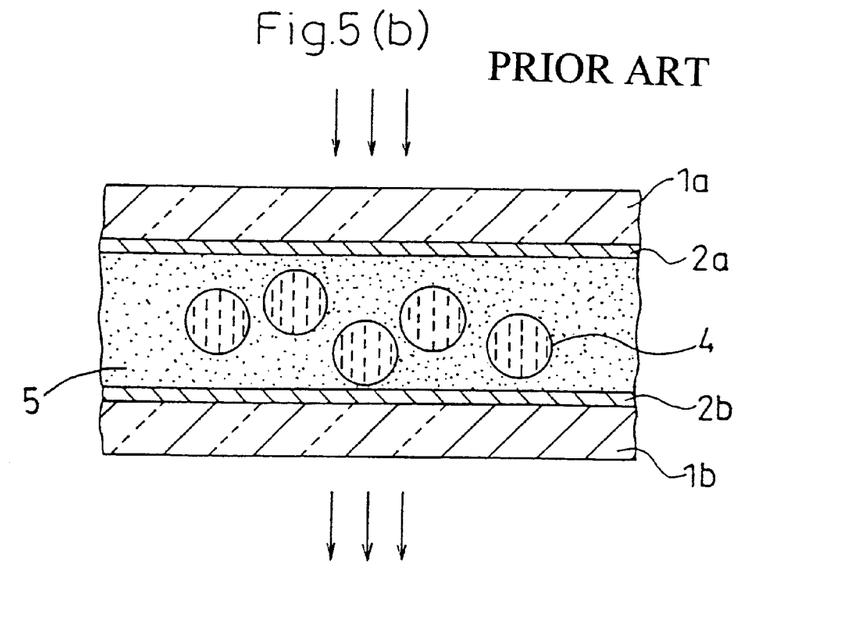
FIG. 5(b) is a cross-sectional view diagrammatically showing the phenomenon of light transmission caused by the polymer dispersed liquid crystal when the voltage is not applied thereto.

FIGS. 5(a) and 5(b) are cross-sectional views showing the structure of a conventional liquid-crystal panel of polymer dispersed type. FIG. 5(a) shows the state without a voltage applied, while FIG. 5(b) shows the state with the voltage applied. As shown in FIGS. 5(a) and 5(b), the liquid-crystal panel is constituted by: a pair of glass substrates 1a and 1b having electrodes 2a and 2b, respectively, which are opposed to each other; and a mixture of a liquid crystal 4 and a photo-curing polymer 5 which is filled into the space between the both substrates 1a and 1b. It is also possible to use a thermosetting polymer instead of the photo-curing polymer 5, provided that it contains a crosslinkage-type polymer as its main component.

In a liquid-crystal panel of polymer dispersed type as described above, the liquid-crystal 4 is dispersed and held in the photo-curing polymer 5 or the photo-curing polymer 5 exists in particles or in network in the liquid crystal 4. If a voltage is not applied to the space between the electrodes 2a and 2b, liquid-crystal molecules are randomly oriented so that a difference in refractive index is caused between the photo-curing polymer 5 and the liquid crystal 4, thereby scattering light (see FIG. 5(a)). On the other hand, if the voltage is applied to the space between the electrodes 2a and 2b, the liquid-crystal molecules are oriented in the direction of a resulting electric field so that there is a match in refractive index between the liquid crystal 4 and the photo-curing polymer 5, thereby transmitting light (see FIG. 5(b)). Thus, the liquid-crystal panel of polymer dispersed type utilizes the phenomena of light scattering and light transmission. Spacers dispersed between the substrates 1a and 1b in order to maintain a specified distance therebetween are composed of an insulating material in spherical particles. Specifically, spacers made of a transparent material such as $SiO_2$, benzoguanamine resin, or melamine resin are used at present.

However, the above conventional liquid-crystal panel is disadvantageous in that, when a voltage is not applied to the liquid-crystal panel, i.e., in the black mode, light scattering becomes unsatisfactory in the state shown in FIG. 5(a), so that a sufficient contrast cannot be obtained. Even when the voltage is applied to the liquid-crystal panel, local variations are observed in light transmittance, resulting in uneven display of images.

In view of the foregoing, the present inventors have examined the phenomenon closely, which led to the following findings.

(1) The spacers composed of a transparent polymer material presents no problem if they are used in the liquid-crystal panel of TN type or STN type. However, if they are used in the liquid-crystal panel of polymer dispersed type which utilizes the phenomena of light scattering and light transmission, light scattering becomes unsatisfactory when a voltage is not applied, i.e., in the black mode, so that a sufficient contrast cannot be obtained.

(2) The use of spacers composed of an opaque colored polymer material, instead of a transparent material, is also under consideration as disclosed in Japanese Laid-Open Patent Publication Nos. 63-157130, 1-144021, and 4-15623. Even with the spacers composed of a colored material, however, it is difficult to obtain a sufficient contrast.

(3) When a phase separation is caused by irradiating the photo-curing polymer, which is a crosslinkage-type polymer, with light or by heating the thermosetting polymer, liquid-crystal droplets adjacent to the spacers become larger in size than those not adjacent to the spacers. As a result, the application of a voltage causes a difference in light transmittance between the regions adjacent to the spacers and the other regions, so that a uniform displaying property may not be obtained in a liquid-crystal display apparatus.

SUMMARY OF THE INVENTION

The present invention has been achieved in view of the foregoing and has the following objects.

The first object of the present invention is to provide a liquid-crystal panel in which a difference in light transmittance between the state with a voltage applied and the state without the voltage applied is significant, i.e., a high-contrast liquid-crystal panel by using liquid-crystal droplets and spacers with improved structures.

The second object of the present invention is to provide a liquid-crystal panel in which local variations in light transmittance in the state with the voltage applied are reduced by using spacers with an improved structure.

The third object of the present invention is to provide a liquid-crystal display apparatus with an excellent displaying property by using a liquid-crystal panel with excellent characteristics as described above.

To attain the above first object, a liquid-crystal panel with a first structure comprises: a pair of substrates disposed so as to face each other, each being provided with an electrode for applying a voltage; spacers dispersed in the space between the above pair of substrates, the above polymer member not containing a crosslinkage-type polymer; and droplets of a liquid crystal mixed with the above polymer member and filled in the space between the above pair of substrates, the above droplets of the liquid crystal having a mean diameter of 3.0 $\mu$m or less.

With the above first basic structure, since the liquid crystal to be filled in the space between the substrates in the liquid-crystal panel is in fine droplets, the function of scattering light when a voltage is not applied is enhanced, so that light leakage via the droplets of the liquid crystal seldom occurs. Consequently, a high contrast can be obtained.

The above spacers can be provided with the function of preventing the transmission of visible light. For this purpose, the spacers may be colored or the surface roughness of the spacers may be increased to a degree sufficient to scatter the visible light.

With the structure, light leakage via the spacers seldom occurs in the black mode without the voltage applied, so that a higher contrast can be obtained.

To attain the above first object, a first method of manufacturing a liquid-crystal panel comprises the steps of: preparing in advance a pair of substrates each being provided with an electrode for applying a voltage and dispersing, on one of the above pair of substrates, spacers for holding the substrates at a specified distance; holding the above substrate on which the spacers are dispersed and the other substrate so that they are opposed to each other with the spacers interposed therebetween, mixing a polymer member not containing a crosslinkage-type polymer with a liquid crystal, and filling the mixture into the space between the substrates; and promoting the crosslinkage of the above polymer member, while causing a phase separation between the above polymer member and the above liquid crystal simultaneously, so as to separate the above liquid crystal in droplets having a mean diameter of 3.0 μm or less. If a photo-curing polymer is used as a material for composing the above polymer member, in particular, the above polymer member is irradiated with light equal to or intenser than 500 $mJ/cm^2$ in the step of promoting crosslinkage of the above polymer member.

In the method, since the dose of light in the step of curing the photo-curing polymer composing the polymer member has been set large, the cross-linking reaction of the polymer member is promoted, so that a distinct phase separation occurs between the liquid crystal and the polymer member. Consequently, the droplets of the liquid crystal, which have been mixed with the polymer member, are miniaturized.

To attain the above second object, a liquid-crystal panel with a second structure comprises: a pair of substrates disposed so as to face each other, each being provided with an electrode for applying a voltage; a polymer member filled in the space between the above pair of substrates, the above polymer member not containing a crosslinkage-type polymer; and spacers dispersed in the space between the above pair of substrates so as to hold the above pair of substrates at a specified distance, the surface portions of the above spacers having at least either of a scare affinity with the droplets of the liquid crystal and a large affinity with the above polymer member.

With the second structure, the effect of the liquid crystal moving far away from the surfaces of the spacers becomes larger than the effect of the liquid crystal moving closer to the surfaces of the spacers. Consequently, during the phase separation caused by crosslinkage of the polymer material, the diameter of the droplet of the liquid crystal in a region adjacent to the spacer does not become larger than the diameter of the droplet of the liquid crystal in a region not adjacent to the spacer. Accordingly, local variations in light transmittance of the liquid-crystal panel in the state with the voltage applied are minimized.

In a specific structure of the above liquid-crystal panel with the second structure, the surface portions of the spacers may be treated so as to have the property of rejecting the liquid crystal. Consequently, the liquid crystal is kept away from the surfaces of the spacers in the liquid-crystal panel, so that the diameter of the droplet of the liquid crystal does not become particularly large in a region adjacent to the spacer.

In another specific structure, at least the surface portions of the spacers are composed of a polymer material of the same type as that of the above polymer member, with the result that the polymer member preferentially approaches the surfaces of the spacers. Consequently, the diameter of the droplet of the liquid crystal is not increased in a region adjacent to the spacer.

It is also possible to add the above second structure to the liquid-crystal panel with the above first structure.

In the liquid-crystal panel with the above first or second structure, a photo-curing polymer can be used as the crosslinkage-type polymer serving as the main component of the above polymer member.

With the structure, a phase separation is caused between the polymer member and the liquid crystal by utilizing the cross-linking property of the photo-curing polymer, so that an excellent dispersibility is imparted to the droplets of the liquid crystal.

A second method of manufacturing a liquid-crystal panel comprises the steps of: preparing in advance a pair of substrates each being provided with an electrode for applying a voltage and dispersing, on one of the above pair of substrates; spacers for holding the substrates at a specified distance, the surface portions of the above spacers having either a scarce affinity with droplets of a liquid crystal and a large affinity with a polymer member; holding the above substrate on which the spacers are dispersed and the other substrate so that they are opposed to each other with the spacers interposed therebetween, mixing the above polymer member not containing a crosslinkage-type polymer with a liquid crystal, and filling the mixture into the space between the substrates; and promoting the crosslinkage of the above polymer member, while causing a phase separation between the above polymer member and the above liquid crystal simultaneously.

Specifically in the above second method of manufacturing a liquid-crystal panel, a surface-active agent containing fluorine as its main component is adsorbed by the surfaces of the spacers so that the surface portions of the spacers have the property of rejecting the above liquid crystal or the spacers at least the surface portions of which are composed of a material of the same type as that of the above polymer member are used.

With the above method, the liquid-crystal panel with the second structure can be obtained.

To attain the above third object, the liquid-crystal display apparatus of the present invention comprises in addition to the liquid-crystal panel with the above first or second structure: light radiating means for irradiating the liquid-crystal panel with light; a driving circuit for applying an electric signal to the above liquid-crystal panel; and a displaying means for displaying the pattern of light outputted from the above liquid-crystal panel.

DETAILED DESCRIPTION OF THE PREFERRED EMBODIMENTS

First Embodiment

Below, a first embodiment of the present invention will be described with reference to the drawings.

Figure 1:
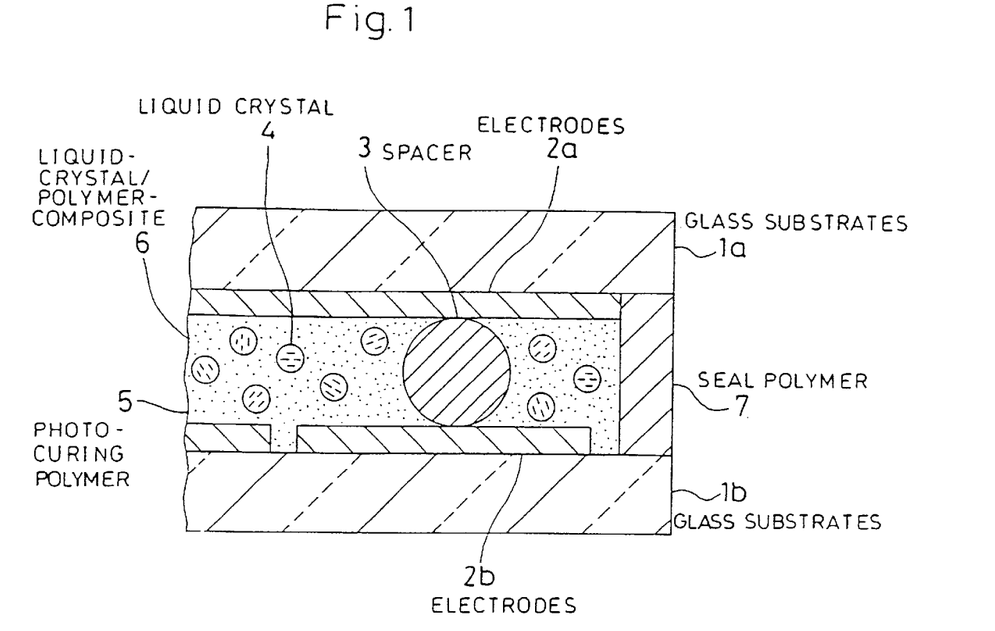
FIG. 1 is a cross-sectional view diagrammatically showing the structure of a liquid-crystal panel according to a first embodiment.

FIG. 1 shows a liquid-crystal panel according to the first embodiment, which comprises: a pair of transparent glass substrates $1a$ and $1b$ opposed to each other; a pair of electrodes $2a$ and $2b$ provided on the respective inner surfaces of the glass substrates $1a$ and $1b$ so as to face each other; spacers 3 interposed between the glass substrates $1a$ and $1b$ so as to hold the electrodes $2a$ and $2b$ at a specified distance; a liquid-crystal/polymer composite 6 composed of a liquid crystal 4 and a photo-curing polymer 5 to be introduced into the space between the glass substrates $1a$ and $1b$; and a seal polymer 7 for sealing the edge portions of the liquid-crystal panel.

Below, a description will be given to a method of manufacturing the liquid-crystal panel according to the first embodiment with reference to the flow chart of FIG. 2.

On the pair of transparent glass substrates $1a$ and $1b$ are preliminarily formed the transparent conductive films (ITO films) $2a$ and $2b$, each serving as an electrode. After cleaning the glass substrates $1a$ and $1b$ in Step ST1, spherical particles of $SiO_2$, each having a diameter of 13 $\mu$m and colored with black, are dispersed as the spacers 3 on the electrode $2a$ of the glass substrate $1a$ in Step ST2, while the seal polymer 7 is printed on the edge portions of the other glass substrate $1b$ in Step ST3. These glass substrates $1a$ and $1b$ are bonded together with the spacers 3 and seal polymer 7 interposed therebetween in Step ST4. The seal polymer 7 is cured in Step ST5 with the application of heat.

Subsequently, in Step ST6, a mixture of the liquid crystal 4 (which will be turned into droplets later on) and an ultraviolet-curing polymer, which is a type of photo-curing polymer, is injected into the space between the glass substrates $1a$ and $1b$. The components of the mixture are as follows:

| liquid crystal | E-7 (commercially available from British Drug House Ltd.) (80 wt %) |
|---|---|
| ultra-violet curing polymer | mixture of polyester acrylate (1.8 wt %) and 2-ethylhexyl acrylate (18 wt %) |
| photopolymerization initiator | Darocur-1173 (commercially available from Merck Ltd.) (0.2 wt %) |

Next, in Step ST7, the liquid-crystal panel after injection is irradiated with an ultra-violet (UV) ray, thereby inducing a polymerization of the mixture of polyester acrylate and 2-ethlhexyl acrylate to form the photo-curing polymer 5. The in turn causes a phase separation between the liquid crystal 4 and the photo-curing polymer 5 so that droplets of the liquid crystal 4 are dispersed in the photo-curing polymer 5, while the photo-curing polymer 5 is cured simultaneously. Thereafter, an injection hole is sealed in Step ST8, thus completing the fabrication of the liquid-crystal panel.

Next, a description will be given to a test performed in order to elucidate the relationship between the doze of light for the photo-curing polymer 5 and the mean diameter of the droplets of the liquid crystal 4

Figure 2:
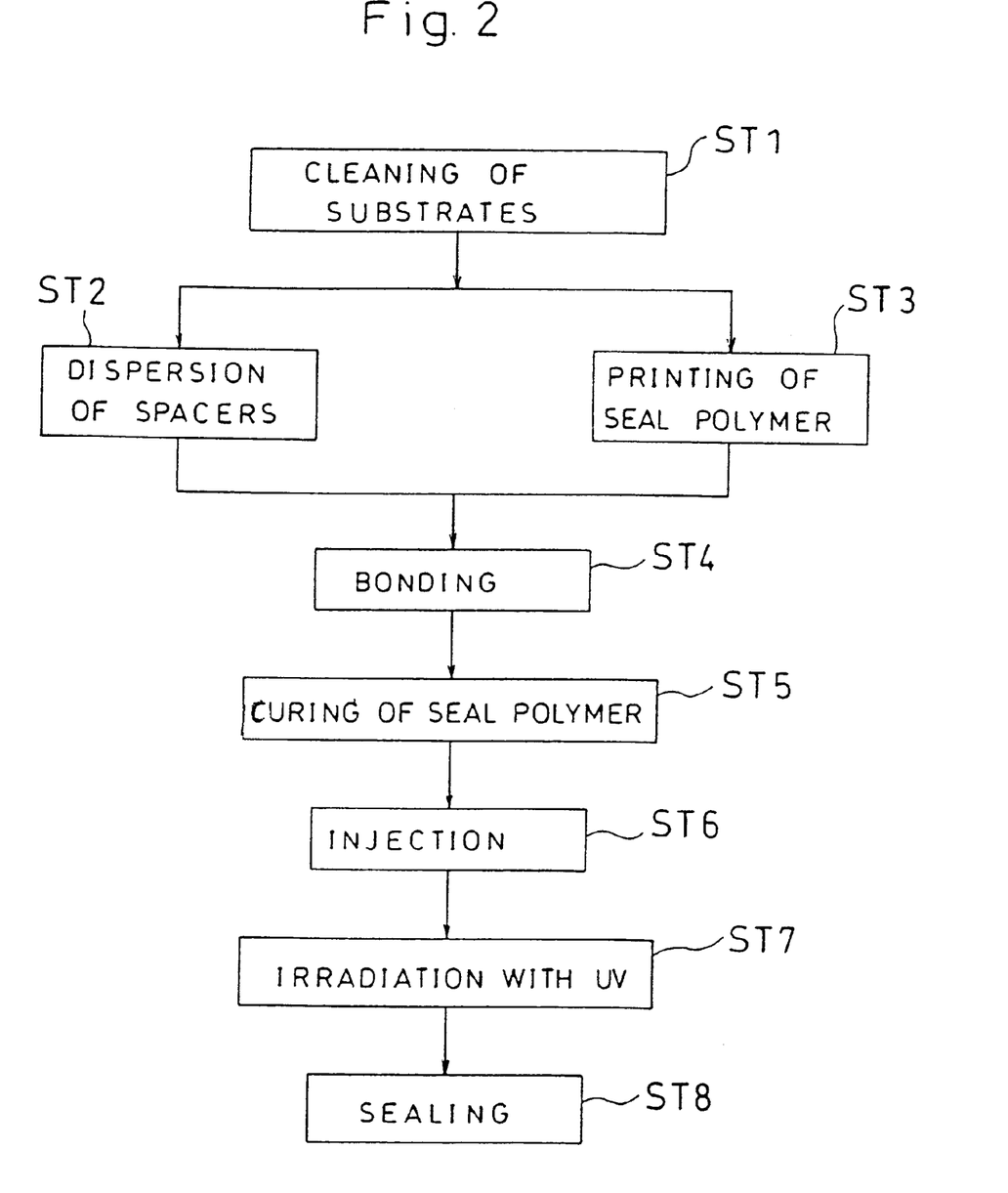
FIG. 2 is a flow chart showing the process of manufacturing the liquid-crystal panel according to the first embodiment.

Liquid-crystal panels were fabricated in accordance with the procedure shown in FIG. 2. In this case, the dose of an ultra-violet ray for the photo-curing polymer 5 was varied and set to 100, 200, 300, 400, 500, 1000, and 2000 mJ/cm$^2$ for the respective liquid-crystal panels. For comparison, there was fabricated another liquid-crystal panel in which colorless and transparent particles of $SiO_2$ were scattered as the spacers.

These liquid-crystal panels were examined using a microscope and it was observed that the mean diameter of the droplets of the liquid crystal 4 in the liquid panel irradiated with an ultraviolet ray of 400 mJ/cm$^2$ or less in the curing step was as large as 5.5 $\mu$m or more, while the mean diameter of the liquid-crystal droplets in the liquid-crystal panel irradiated with an ultraviolet ray of 500 mJ/cm$^2$ or more in the curing step was as small as 1.0 to 3.0 $\mu$m. The contrasts of the liquid-crystal panels and the mean diameters of the droplets of the liquid crystal 4 therein were measured, the results of which are shown below in Table 1.

TABLE 1

|  | COLORLESS TRANSPARENT SPACER | BLACK SPACER | | | | | | |
|---|---|---|---|---|---|---|---|---|
| DOSE OF ULTRA-VIOLET RAY (mJ/cm$^2$) | 500 | 100 | 200 | 300 | 400 | 500 | 1000 | 2000 |
| CONTRAST | 53 | 25 | 37 | 46 | 51 | 98 | 108 | 110 |
| MEAN DIAMETER OF LIQUID-CRYSTAL DROPLETS ($\mu$m) | 2.4 | 15.4 | 10.7 | 8.2 | 5.5 | 2.4 | 1.7 | 1.0 |

It can be appreciated from the above Table 1 that the liquid-crystal panel using the colorless and transparent spacers is low in contrast and unsatisfactory in the black mode compared with the liquid-crystal panel using the colored spacers. For example, if the liquid-crystal panel using the black spacers and the liquid-crystal panel using the transparent spacers are irradiated with the same ultraviolet ray of 500 mJ/cm$^2$, the liquid-crystal panel with the black spacers presents a high contrast of 98, while the liquid-crystal panel with the transparent spacers has a low contrast of 53. This may be because light leakage in which the spacer transmits light occurs in the black mode without a voltage applied.

The same tendency can be recognized even when the mean diameter of the droplets of the liquid crystal 4 is small. That is, if the liquid-crystal panels using the black spacers are compared with each other, the mean diameter of the droplets of the liquid crystal becomes larger as the dose of the ultraviolet ray is reduced. For example, if the dose of the ultraviolet ray is 500 mJ/cm$^2$, the diameters of the droplets of the liquid crystal are surely 3.0 μm or less and the contrast obtained is as large as 98 or more. By contrast, if the dose of the ultraviolet ray is 400 mJ/cm$^2$ or less, the mean diameter of the droplets of the liquid crystal is as large as 5.5 μm or more and the contrast obtained is as small as 51 or less. This may be because the light leakage via the droplets of the liquid crystal 4 occurs in the black mode, since the mean diameter of the droplets of the liquid crystal 4 is large.

On the other hand, if the black spacers are used and the dose of the ultraviolet ray is increased so that an ultraviolet ray of 500 mJ/cm$^2$ or more is applied in the curing step, a distinct phase separation occurs between the liquid crystal 4 and the photo-curing polymer 5 so that the mean diameter of the droplets of the liquid crystal 4 becomes as small as 3.0 μm or less. Consequently, light leakage via the droplets of the liquid crystal 4 or via the spacers 3 hardly occurs in the black mode.

Even when the transparent spacers are used, if an ultraviolet ray of 500 mJ/cm$^2$ is applied, the contrast obtained is higher than the contrast obtained in the case where the black spacers are used but only an ultraviolet ray of 100 mJ/cm$^2$ is applied (53 versus 25). Hence, it can be concluded that a mere reduction in size of the droplets of the liquid crystal 4 is effective to a certain degree in raising the contrast.

Second Embodiment

Next, a second embodiment will be described.

The structure of the liquid-crystal panel in the second embodiment is substantially the same as the structure of the liquid-crystal panel in the above first embodiment of FIG. 1, except that the spacer 3 in the present embodiment is not spherical, but in the shape of a rod having a diameter of 10 μm and a length of 50 μm, though the drawing thereof is omitted here. The rod-shaped spacer 3 is composed of a glass fiber colored with black. As for the other components, the structures thereof are the same as those shown in FIG. 1.

A voltage was applied to the liquid-crystal panel thus fabricated and the contrast and the mean diameter of the droplets of the liquid crystal 4 were measured, the results of which are shown below in Table 2.

TABLE 2

| | COLORLESS TRANSPARENT SPACER | BLACK SPACER | | | | | | |
|---|---|---|---|---|---|---|---|---|
| DOSE OF ULTRAVIOLET RAY (mJ/cm$^2$) | 500 | 100 | 200 | 300 | 400 | 500 | 1000 | 2000 |
| CONTRAST | 53 | 21 | 29 | 41 | 49 | 88 | 93 | 95 |
| MEAN DIAMETER OF LIQUID-CRYSTAL DROPLETS (μm) | 2.4 | 21.0 | 14.3 | 9.1 | 6.2 | 3.0 | 2.6 | 2.0 |

In Table 2 is also shown the contrast of a liquid-crystal panel using colorless and transparent spacers for comparison with the liquid-crystal panel according to the present embodiment. It will be appreciated from Table 2 that, even when the rod-shaped spacers are disposed as in the present embodiment, the liquid-crystal panel using the black spacers and irradiated with an ultraviolet ray of 500 mJ/cm$^2$ or more in the curing step presents an excellent contrast of 88 or more.

Although the spacers were colored so that they function as means for preventing the transmission of visible light in the above first and second embodiments, the present invention is not limited to these embodiments. If the surface roughness of the spacers is increased, light is scattered by the surfaces of the spacers so that light leakage via the spacers in the black mode can be prevented effectively.

Third Embodiment

Next, a third embodiment will be described.

The structure of the liquid-crystal panel in the third embodiment is basically the same as the structure of the liquid-crystal panel in the above first embodiment (see FIG. 1), except that the surface of the spacer 3 shown in FIG. 1 is treated so as to adsorb a surface-active agent containing fluorine as its main component. The spacer itself is a black spherical particle of SiO$_2$ having a diameter of 13 μm and has the same structure as that of the spacer 3 used in the above first embodiment.

The process of manufacturing the liquid-crystal panel in the present embodiment is obtained by providing the steps shown in FIG. 2 with an additional step of treating the surface of the spacer 3, though the drawing thereof is omitted here.

Next, a description will be given to the manufacturing process based on a test performed in order to elucidate the relationship between the presence or absence of the surface treatment for the spacers and the mean diameter of the droplets of the liquid crystal 4.

The liquid-crystal panels were fabricated in accordance with the procedure shown in FIG. 2. In each of the liquid-crystal panels, the glass substrates 1a and 1b, electrodes 2a and 2b, spacer 3, liquid crystal 4, photo-curing polymer 5, and seal polymer 7 are made of the same materials as used in the above first embodiment. In the present test, however, the dose of the ultraviolet ray for the ultra-violet curing polymer was changed to 1500 mJ/cm$^2$ and two types of spacers 3, one with the surface treatment for adsorbing the surface-active agent containing fluorine as its main component and the other without the surface treatment, were used for comparison. In either case, the material and configuration of the spacers are the same and the spacers are composed of black spherical particles of $SiO_2$. The surface portions of the spacers have the property of rejecting a liquid crystal, imparted to the spacers by surface treatment in which a surface-active agent containing fluorine as its main component is absorbed by the surface of the spacers.

These liquid-crystal panels were examined using a microscope. In the liquid-crystal panel using the spacers without the surface treatment, the diameter of the liquid-crystal droplet in a region not adjacent to the spacer was about 1.5 μm, while the diameter of the liquid-crystal droplet in a region adjacent to the spacer was about 4.5 μm, which was substantially tripled. On the other hand, in the liquid-crystal panel of the present embodiment with the surface treatment using the surface-active agent containing fluorine as its main component, it was recognized that the diameters of the liquid-crystal droplets in a region adjacent to the spacer as well as in a region not adjacent to the spacer are of the same order (about 1.0 μm) and uniform. A voltage was applied to these liquid-crystal panels so that their respective displaying properties were compared with each other. As a result, the liquid-crystal panel using the spacers with the surface treatment of the present embodiment excellently presented a uniform displaying property, while uneven display of images was observed in the conventional liquid-crystal panel without the surface treatment.

Fourth Embodiment

Next, a fourth embodiment will be described.

In the present embodiment also, the basic structure of the liquid-crystal panel and the materials of the individual components thereof are the same as described in the above first embodiment (see FIG. 1), except that the spacers 3 in the liquid-crystal panel of the present embodiment are composed of a polymer material of acrylic system, which is of the same type as that of the photo-curing polymer 5 composing the liquid-crystal/polymer composite 6.

A voltage was applied to the liquid-crystal panel so that its displaying property was compared with the displaying property of the conventional liquid-crystal panel with colorless and transparent particles of $SiO_2$ dispersed therein. As a result, the liquid-crystal panel of the present embodiment excellently presented a uniform displaying property, while uneven display of images was observed in the conventional liquid-crystal panel.

Fifth Embodiment

Next, a fifth embodiment will be described.

Figure 3:
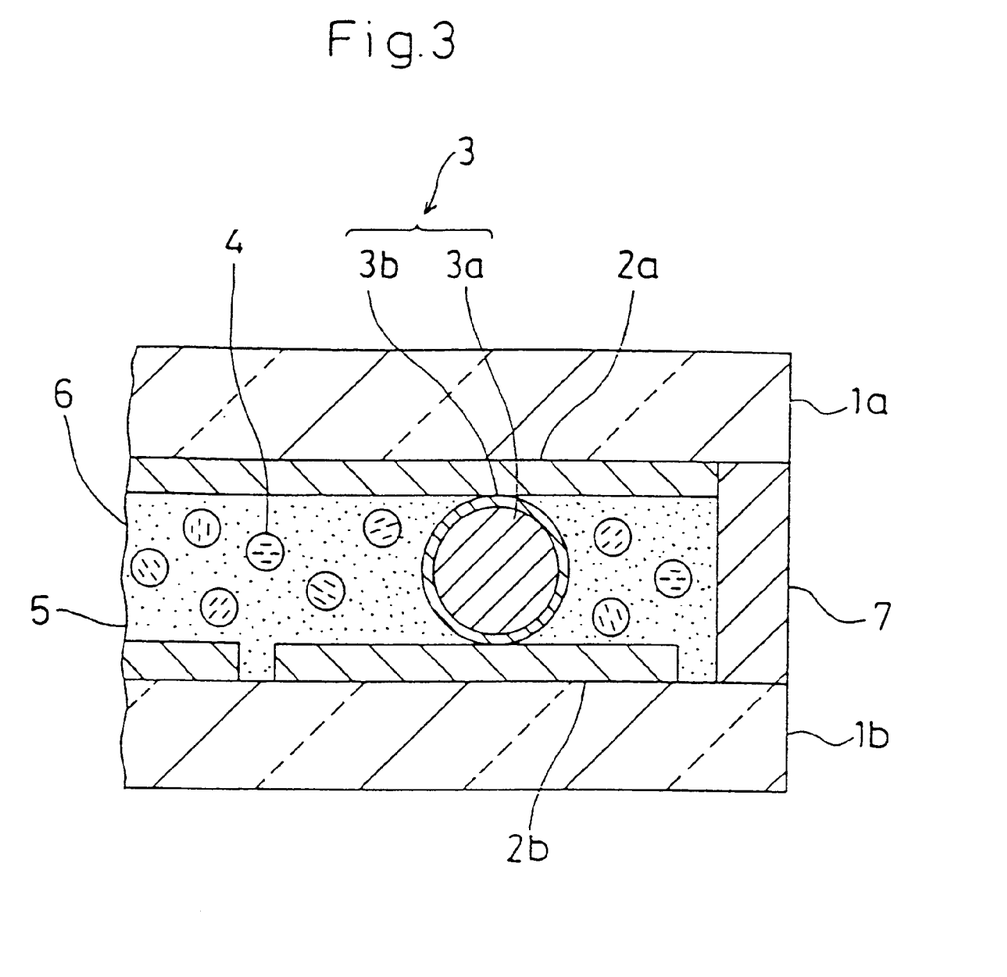
FIG. 3 is a cross-sectional view diagrammatically showing the structure of the liquid-crystal panel according to a fifth embodiment.

FIG. 3 is a cross-sectional view diagrammatically showing the structure of the liquid-crystal panel in a fifth embodiment. In the present embodiment, the spacer 3 consists of a main body 3a composed of a $SiO_2$ particle and a surface portion 3b for covering up the $SiO_2$ particle forming the main body 3a. The surface portion 3b is composed of a polymer of acrylic system, similarly to the photo-curing polymer 5. That is, unlike the above fourth embodiment, only the surface portion of the spacer 3 is composed of a polymer material of the same type as that of the photo-curing polymer 5. The structures of the other components of the liquid-crystal panel according to the present embodiment are the same as those shown in FIG. 1.

A voltage was applied to the liquid-crystal panel so that its displaying property was compared with the displaying property of the conventional liquid-crystal panel. As a result, the liquid-crystal panel of the present embodiment excellently presented a uniform displaying property, while uneven display of images was observed in the conventional liquid-crystal display.

Sixth Embodiment

Below, a sixth embodiment will be described.

Figure 4:
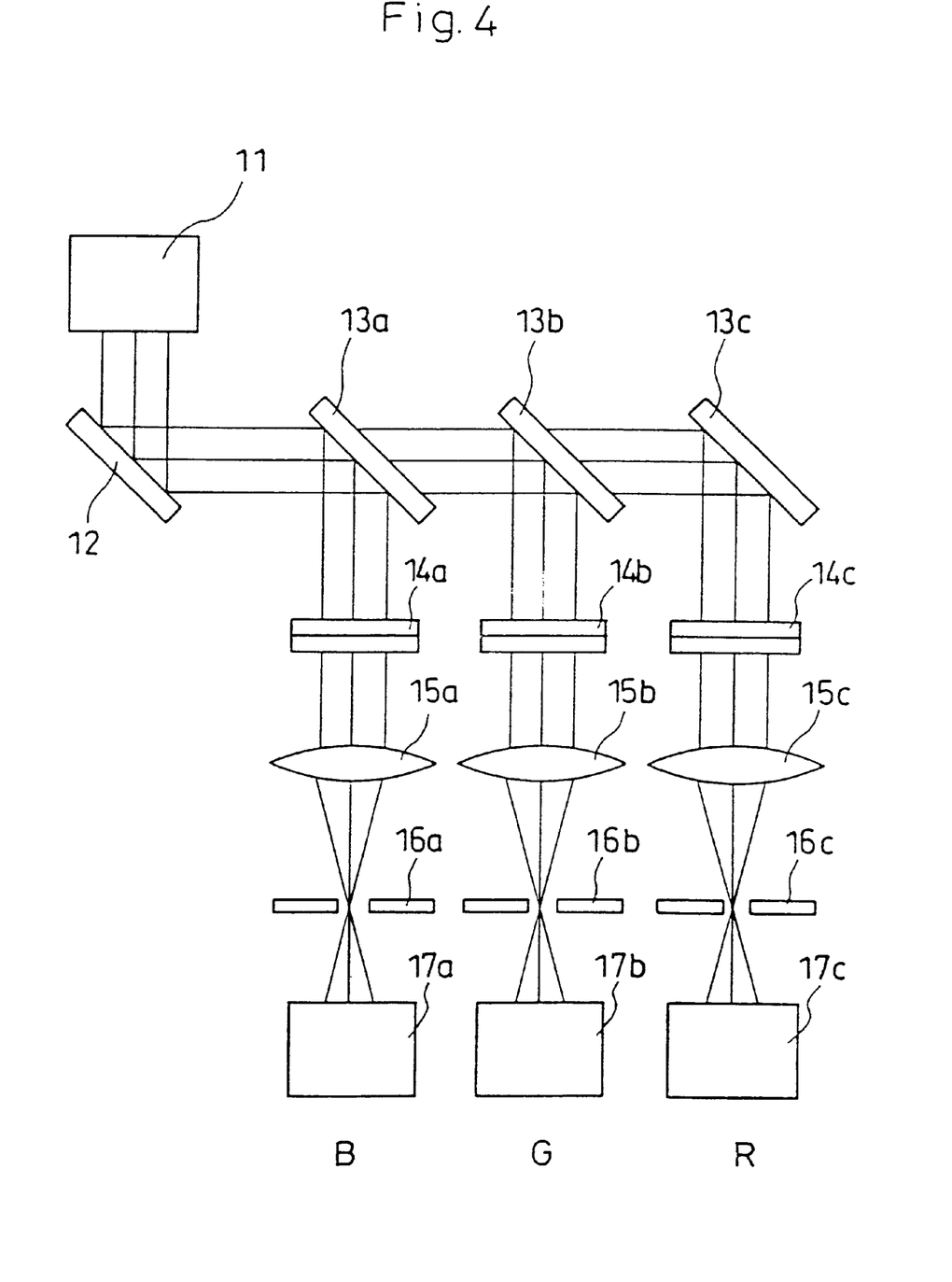
FIG. 4 is a block diagram schematically showing the structure of a liquid-crystal display apparatus according to a sixth embodiment.

FIG. 4 is a block diagram schematically showing the structure of a liquid-crystal display apparatus according to the sixth embodiment. As shown in the drawing, the liquid-crystal display apparatus according to the present embodiment comprises; a light source 11 composed of a metal halide lamp; a UV/IR cutting filter 12; and three optical systems for displaying three colors, which are placed behind the light source 11 and UV/IR cutting filter 12. The three optical systems consist of dichroic mirrors 13a, 13b, and 13c, liquid-crystal panels 14a, 14b, and 14c, lenses 15a, 15b, and 15c, apertures 16a, 16b, and 16c, and projecting lens systems 17a, 17b, and 17c. Each of the liquid-crystal panels 14a, 14b, and 14c is connected to a driving circuit, though the drawing thereof is omitted here. The above three liquid-crystal panels 14a, 14b, and 14c use black spacers and were fabricated by setting the dose of an ultraviolet ray in the step of curing the photo-curing polymer to 2000 mJ/cm$^2$ so that the mean diameter of the droplets of the liquid crystal becomes 1.0 μm.

Light from the light source (metal halide lamp) 11 is transmitted by the UV/IR cutting filter 12 and then separated into blue color, green color, and red color by the dichroic mirrors 13a, 13b, and 13c, which are incident upon the liquid-crystal panels 14a, 14b, and 14c, respectively. After passing through the lenses 15a, 15b, and 15c and through the apertures 16a, 16b, and 16c, the three colors are incident upon the projecting lens systems 17a, 17b, and 17c. When an image was projected with the use of the apparatus, excellent high-contrast display was obtained.

In addition, liquid-crystal panels using black spacers, in which the dose of the ultra-violet ray in the step of curing the photo-curing polymer was set to 500 mJ/cm$^2$ and to 1000 mJ/cm$^2$, were fabricated and liquid-crystal display apparatus using the liquid-crystal panels were fabricated. In this case also, excellent displaying properties were obtained. Similarly excellent displaying properties were also obtained in the case where liquid-crystal display apparatus were formed by using the liquid/crystal panels with the structures of the above second to fifth embodiments.

It is not necessary for each of the pair of substrates disposed in the liquid-crystal panel of the present invention to be transparent. It is sufficient for at least one of the substrates to be transparent. The liquid-crystal display apparatus may have reflecting lens systems in place of the projecting lens systems.

Although the mixture of polyester acrylate and 2-ethylhexyl acrylate was used in each of the above embodiments, it is also possible to use 2-hydroxylethyl acrylate, trimethylol-propane-triacrylate, and the like. It is also possible to use a thermosetting polymer, instead of the photo-curing polymer, so that it reacts with the application of heat. If a thermosetting polymer of novolac system is used in this case, hexamethylenediamine (hexamine) can be used as a curing agent.

The liquid crystal can be E-8 (commercially available from British Drug House Ltd.), ZLI4792 (commercially available from Merck Ltd.), TL202 (commercially available from Merck Ltd. ), or the like. The polymerization initiator can be Irgacure 184 (commercially available from Chiba-Geigy Ltd.), Irgacure 651 (commercially available from Chiba-Geigy Ltd.), or the like.

In other words, the present invention is effective irrespective of the liquid-crystal material and polymer material used.

A surface reforming agent for treating the surface of the spacer is not limited to the surface-active agent containing fluorine as its main component. A silane coupling agent (e.g., KA1003, KBC1003, KBE1003, KBM1003, KBM503, KBM303, KBM403, KBE402, KBM603, KBM602, KBE903, KBM573, KBM803, or KBM703, each commercially available from Shinetsu Chemical Co., Ltd.; A-143, A-150, A-151, A-171, A-172, A-174, A-186, A-187, A-189, A-1100, A-1120, or A-1160, each commercially available from NIPPON UNICAR Co., Ltd.; or SH6020, SZ6023, SH6026, SZ6030, SZ6032, SH6040, SZ6050, SH6062, SZ6070, SZ6072, SH6075, SH6076, SZ6079, SZ6083, SZ6300, AY43-021, PRX11, PRX19, or PRX24, each commercially available from Toray Silicone Co., Ltd.), a silicone surface-active agent (e.g., L-77, L-720, L-722, L-5310, L-7001, L-7002, L-7500, L-7600, L-7602, L-7604, L-7607, or Y-7006, each commercially available from NIPPON UNICAR Co., Ltd.), a silane monomer (e.g., A-162 or A-163, each commercially available from NIPPON UNICAR Co.,), a silicone primer (e.g., AP-133, Y-5106, Y-5254, or APZ-6601, each commercially available from NIPPON UNICAR Co.,), a coupling agent of titanate system (e.g., PLENACT, KRTTS, KR38S, KR44, KR46B, KR55, KR138SS, KR238S, 338X, KR2S, KR7, KR9S, KR11, KR12, KR34S, or KR41B, each commercially available from AJINOMOTO CO., INC.), a coupling agent of aluminum system (e.g., AL-M commercially available from AJINOMOTO CO., INC.), a surface-active agent of amino acid system (e.g., AMISOFT or CAE, each commercially available from AJINOMOTO CO., INC.), an agent for homeotropic orientation (e.g., DMOAP or ODS-E, each commercially available from Chisso Corporation), or the like is also effective. If colored spacers are subjected to the surface treatment, light leakage in the state without the voltage applied is eliminated, so that the contrast is further improved.

To color the spacers, there can be used any of the method of coloring by means of a dye, the method of having an organic substance adsorbed into minute holes in the spacers so that it is carbonized by sintering, the method of sputtering fine black particles into the spacers, and the like.

It is also possible to use an active-matrix substrate composed of active elements provided on one of the electrode substrates

We claim:

1. A method of manufacturing a liquid-crystal panel of polymer dispersed type, comprising the steps of:

preparing in advance a pair of substrates each being provided with an electrode for applying a voltage and dispersing, on one of said pair of substrates, spacers for holding the substrates at a specified distance, surface portions of said spacers having either a scarce affinity with droplets of a liquid crystal or a large affinity with a polymer member;

holding said substrate on which the spacers are dispersed and the other substrate so that they are opposed to each other with the spacers interposed therebetween, mixing a prepolymer member not containing a crosslinkage-type polymer with said liquid crystal, and filling the mixture into the space between the substrates; and curing said prepolymer member and forming said polymer member, while causing a phase separation between said polymer member and said liquid crystal simultaneously, so as to separate said liquid crystal in droplets having a mean diameter of 3.0 $\mu$m or less, wherein said polymer member comprises a photo-curing polymer and said polymer member is irradiated with light equal to or more intense than 500 mJ/cm$^2$ in the step of curing said prepolymer member.

2. A method of manufacturing a liquid-crystal panel of polymer dispersed type, according to claim 1, further comprising the step of treating the surface portions of said spacers so that they have the property of rejecting said liquid crystal.

3. A method of manufacturing a liquid-crystal panel of polymer dispersed type according to claim 2, wherein, in the step of treating the surface portions of said spacers so that they have the property of rejecting the liquid crystal, a surface-active agent containing fluorine as its main component is absorbed by the surfaces of the spacers.

4. A method of manufacturing a liquid-crystal panel of polymer dispersed type according to claim 1, wherein at least the surface portions of the spacers are composed of a material of the same type as that of said polymer member.

* * * * *